(12) United States Patent
Drelser

(10) Patent No.: US 6,481,218 B1
(45) Date of Patent: Nov. 19, 2002

(54) PUMP SYSTEM FOR DELIVERING CRYOGENIC LIQUIDS

(75) Inventor: Helmut Drelser, Trostberg (DE)

(73) Assignee: Linde Gas Aktiengesellschaft, Wiesbaden (DE)

( * ) Notice: Subject to any disclaimer, the term of this patent is extended or adjusted under 35 U.S.C. 154(b) by 0 days.

(21) Appl. No.: 09/958,155

(22) PCT Filed: Apr. 5, 2000

(86) PCT No.: PCT/EP00/03032

§ 371 (c)(1), (2), (4) Date: Feb. 4, 2002

(87) PCT Pub. No.: WO00/61990

PCT Pub. Date: Oct. 19, 2000

(30) Foreign Application Priority Data

Apr. 8, 1999 (DE) .......................................... 199 15 853

(51) Int. Cl.$^7$ .............................................. F17C 13/00
(52) U.S. Cl. ........................................................ 62/50.6
(58) Field of Search ................................ 62/45.1, 48.1, 62/49.2, 50.1, 50.6, 54.1

(56) References Cited

U.S. PATENT DOCUMENTS

| | | | | |
|---|---|---|---|---|
| 4,472,946 A | * | 9/1984 | Zwick ............................ 62/55 |
| 4,860,545 A | * | 8/1989 | Zwick et al. ................. 62/50.6 |
| 4,917,576 A | * | 4/1990 | Peschka et al. ................ 417/53 |
| 5,537,828 A | * | 7/1996 | Boruch et al. ............... 62/50.1 |
| 5,575,626 A | * | 11/1996 | Brown et al. ................ 417/251 |

* cited by examiner

Primary Examiner—William C. Doerrler
Assistant Examiner—Malik N. Drake
(74) Attorney, Agent, or Firm—Millen, White, Zelano & Branigan, P.C.

(57) ABSTRACT

The invention relates to a pump system for delivering cryogenic liquids. Said pump system can be used for refuelling motor vehicles with $H_2$ and consists of a container (1) for receiving the cryogenic liquid. At least one pump (2) is arranged in said container (1) and delivers the cryogenic liquid to a pressure housing (3) which is connected to a user, e.g. a motor vehicle, via an output line (4). The liquid level (m) in the container (1) is automatically maintained by means of a special arrangement of the liquid inlet (i) and the gas recirculating line (j) and by separating the container (1) into two chambers (h and f) which are preferably separated by the pressure housing (3). A secure operating mode of the pump system is thus obtained.

7 Claims, 2 Drawing Sheets

PUMP SYSTEM FOR DELIVERING CRYOGENIC LIQUIDS

The invention relates to a pump system for delivering cryogenic liquids that consists of a storage tank for the cryogenic liquid that forms a liquid chamber and a gas chamber and at least one pump that is arranged in a container, whereby the container is connected to the storage tank in such a way that a liquid level can be adjusted in the container.

To deliver cryogenic liquids at temperatures of below −200° C., to date generally one-cylinder pumps that are inserted from above into an insulating vessel are used. For reasons of installation technology, the discharge of the feeder stream is carried out via this upper pump installation opening in the insulating vessel. Filling the vessels with the media to be delivered is carried out in most cases by a large storage tank, whereby determining the maximum filling height in these vessels is found by expansion pipes (sounding pipes) or content displays. The control of the maximum filling height is carried out in most cases manually or by a contact that is triggered by the liquid, by which a solenoid valve is actuated in the gas feed or exhaust line. Since the pumps cannot be operated without sub-cooling the feeder liquid, these large-volume vessels have a pressure buildup device by which the feeder liquid can be sub-cooled within a short time.

Since especially hydrogen in liquefied form is becoming increasingly more important and motor vehicles are already operated with hydrogen, it is necessary to provide suitable pumps for refueling these motor vehicles.

The known pumps may be suitable for laboratory experiments with small feeder streams and large reliable pressure pulsations; for a quick, pulsation-free liquid refueling of motor vehicles, however, this type of pump is unsuitable. In addition, such "gas station pumps" must always be ready for use (cold-start) so that by the structurally necessary compact type of design in the known pumps, an enormous flow of heat into the liquid to be delivered takes place and the liquid sub-cooling that is necessary for the function is quickly withdrawn.

The object of this invention is to make available a pump system of the above-mentioned type with which larger amounts of cryogenic liquids, especially also liquid hydrogen, can also be delivered economically and reliably.

This object is achieved according to the invention in that
a) the container is divided into two chambers (h, f), whereby one chamber (h) is arranged completely below the gas chamber of the storage tank and is connected via a liquid feed line to the liquid chamber of the storage tank, while other chamber (f) is arranged above chamber (h) and at least partially also below the gas chamber of the storage tank, whereby chamber (f) is connected via a gas return line with the gas chamber of the storage tank,
b) the induction side of the pump is connected to chamber (h), while the pressure side is connected to a discharge point provided outside of the container for discharging cryogenic liquid to a consumer,
c) chambers (h) and (f) are connected to one another via a connecting line, and
d) above the open end of the gas return line that ends in chamber (f), a gas chamber remains.

The proposed division of the container into two chambers, in connection with a gas return line, makes possible a spontaneous stabilization of the liquid level in this container, whereby the liquid in chamber (f) is always in the boiling state.

According to an especially preferred embodiment of the invention, the container is divided into chambers (h, f) by means of a pressure housing, which, on the one hand, is connected to the pressure side of the pump and, on the other hand, is connected to the discharge point that is provided outside of the container for discharging cryogenic liquid to a consumer. Suitably several, i.e., at least two, pumps are connected to this pressure housing, whereby the pressure sides of the pumps are connected to the common pressure housing. In addition, a thermal separation of chambers (h) and (f), which is also achieved by the pressure housing according to the preferred embodiment, is advantageous.

The pump is advantageously designed as a reciprocating pump with a connecting rod and spring recovery, whereby the pump pressure stroke can be implemented by exerting tensile forces on the plunger by means of the connecting rod, and the plunger can be returned to a starting position by means of springs. Several such pumps are suitably inserted in the container. Because of the possibility of individual installation and the pumps that operate on suction, the cross-sections that are relevant for heat conduction at the pumps and at the container are kept very small, by which only a very small input of heat into the container liquid is carried out. For further reduction of heat input in the container, the connecting rod is preferably brought out from the container via a seal. In the case of the especially practical solution, according to which the pump is used from above in the container, the connecting rod is brought out from the container via a heat-insulated container neck. To further reduce the gas heat conduction, an insulating cartridge can be provided in the neck of the container.

The pump system according to the invention can advantageously be used for a whole series of applications. In connection with a corresponding swash plate drive, the number as well as the diameter of the individual pumps in a common pressure housing are greatly variable, so that the pumps according to this design principle can be matched to virtually all required deliveries with minimal pressure pulsation. Because of the merits of this pump design relative to the previous design, the use of such pumps is also conceivable as an aircraft pump in the new generation of hydrogen-driven aircraft. Because of the small masses of the pump system, the cooling losses are very low. By the very simple design structure, a very reasonably priced, reliable and technically high-quality pump is made available.

Below, the invention is to be explained in more detail based on the embodiments that are depicted diagrammatically in the figures.

BRIEF DESCRIPTION OF THE DRAWINGS

FIG. 1 depicts a container 1 that has a completely integrated pressure housing 3 that is immersed in the stored liquid for receiving and for fastening the three pumps 2 that are individually inserted from above. The pressure sides of three pumps 2 are connected to one another via this pressure housing. The conduction of the largely pulsation-free pressure liquid from pressure housing 3 is carried out via pressure line 4 that is also integrated in container 1. By the individual installation of pumps 2 that operate on suction, the cross-sections that are relevant to heat conduction at pumps 2 as well as container 1 can be kept very small. This is achieved in particular by thin connecting rods 29 and thin-walled and small container neck pipe 6. In particular for the operation with liquid hydrogen, the reduced input of heat that is achieved with the invention is of unusual importance, since liquid hydrogen has a very low temperature of about −253° C. and a very low level of evaporation heat. This is aggravated by the fact that as a "gas station pump," the pump must always be operation-ready (cold-start) and the gas accumulation that is produced by the input of heat is considered toxic. Since hydrogen gas has the highest value of gas heat conduction of all technical gases, an insulating cartridge 7 that consists of thin-walled glass fabric-epoxide resin with an insulating bed with the through-holes for connecting rod 29 is used in container neck pipe 6. By this measure, the input of heat into the container is further reduced.

Figure 1:
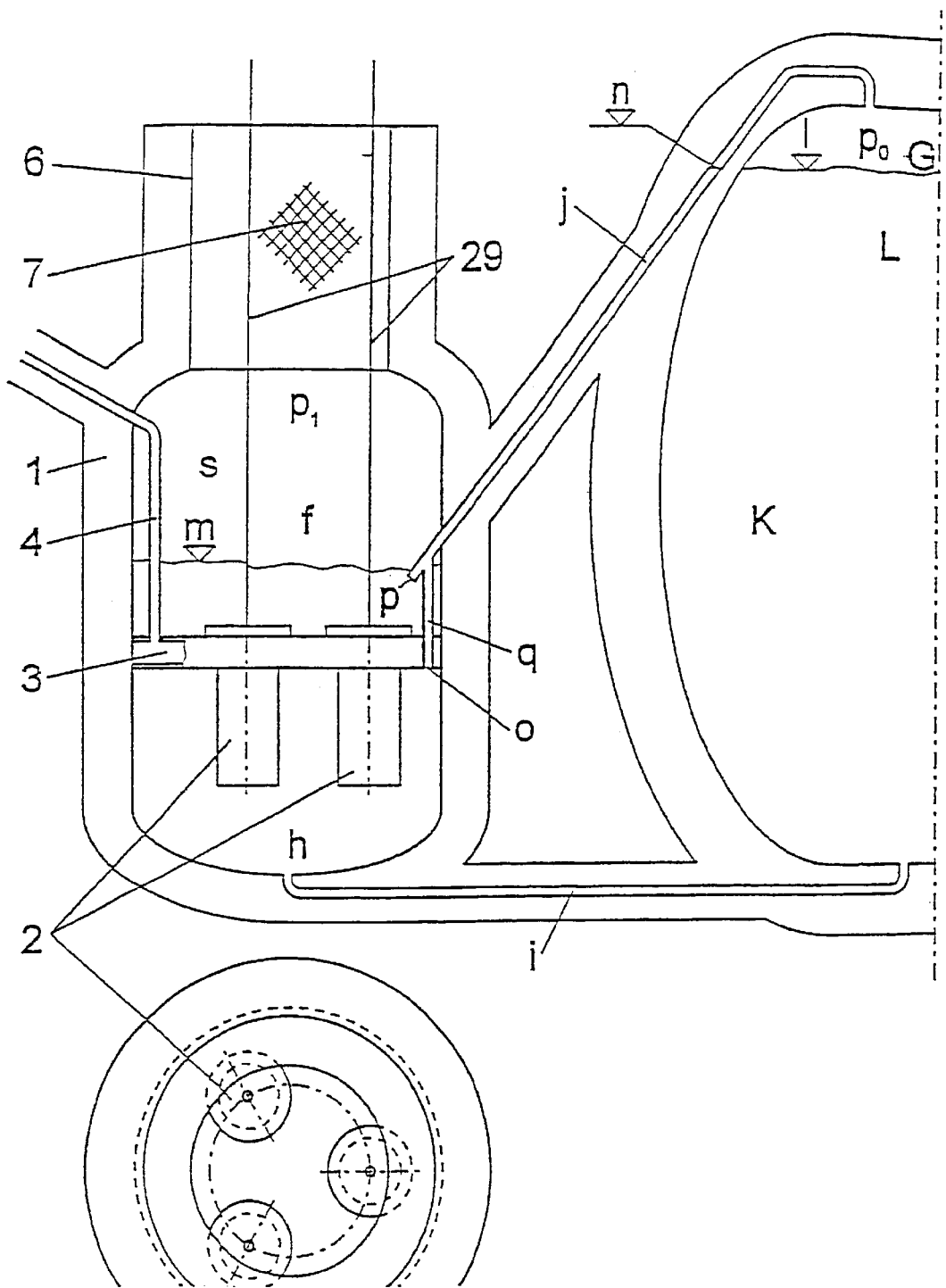
FIG. 1 shows the installation of a three-cylinder hydrogen pump in a container.
Figure 2:
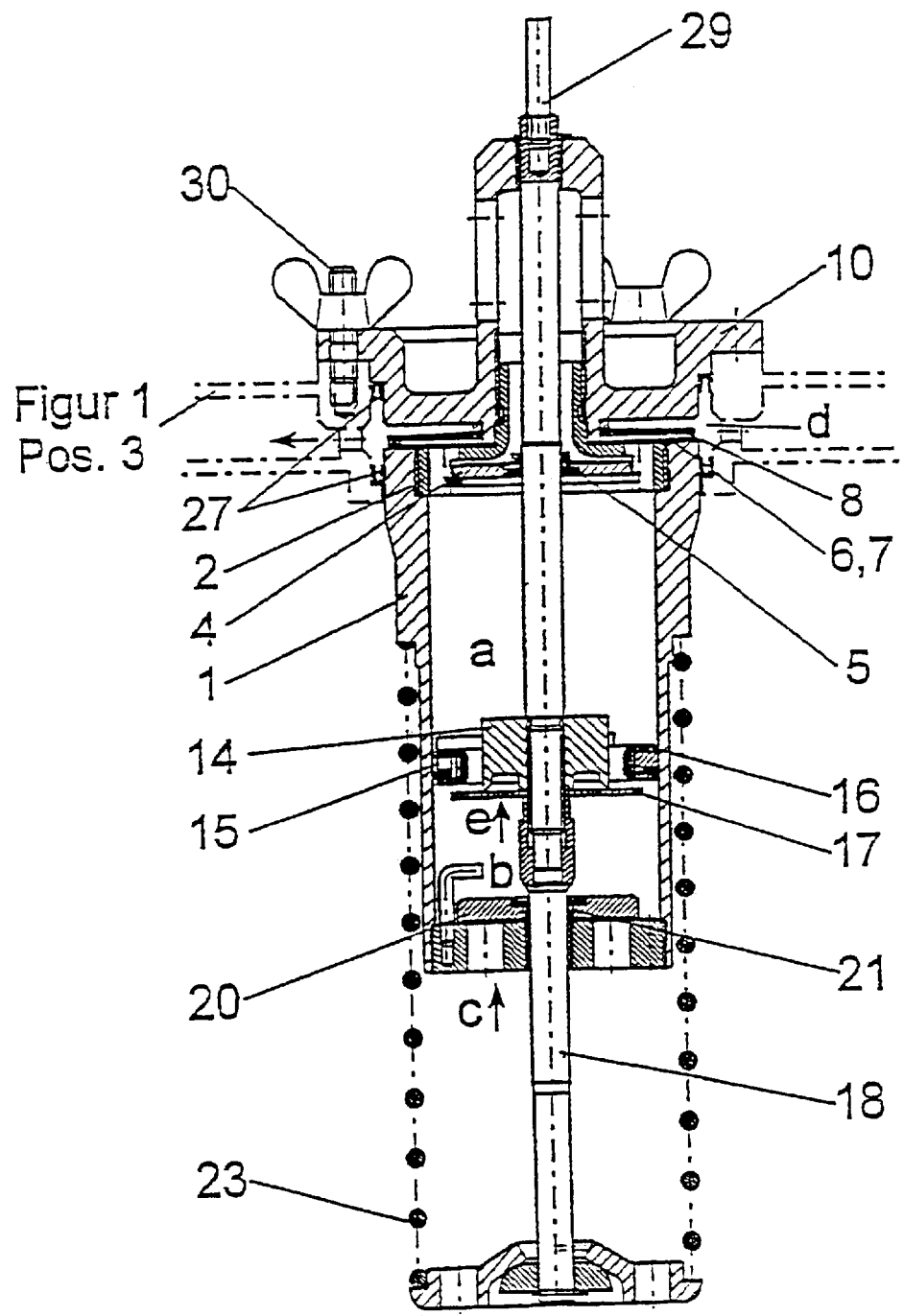
FIG. 2 shows the full section of one of the three pumps inserted into the pressure housing.

Pressure housing 3 is used in container 1 not only to receive pumps 2, but rather it also divides container 1 into two chambers h and f. While chamber h is connected directly via liquid feed line i to the liquid in storage tank K, the liquid is introduced into chamber f via gas return line j. For this purpose, gas return line j ends in chambers h, f as well as in the gas chamber of storage tank K, so that with liquid that communicates with the tank entering at o, p flows into chamber f via pipe opening p. The gas that accumulates when the pump is cooled is fed to gas chamber G of storage tank K. If liquid level m rises over pipe opening p, a liquid seal is carried out, and the gas that is found in chamber f cannot escape. Since the pressure in storage container $P_1$ is greater by the amount of $P_0$+density of the liquid x height than tank pressure $P_0$, the liquid that is found in container 1 in the boiling state is warmer by this amount than in storage tank K. During pump operation, as depicted in FIG. 2, the liquid to be delivered enters via holes c into the pumps. Since these entrance holes are assigned to chamber h (FIG. 1), the liquid to be delivered is removed from the latter. In this case, liquid level n that is in gas return line 7 drops by the amount of the resistance in liquid feed line i. The resulting lowering of pressure in container 1 produces a lowering of liquid level m, so that higher gas pressure $P_1$ is degraded via pipe opening p until a new equilibrium state is established, and the liquid again blocks the gas discharge. Since the feeder liquid that flows from full storage tank K (high liquid column) is not now in a state of pressure and temperature equilibrium, but rather has the lower temperature of storage tank K at $P_0$ (boiling state), a cooling of the temperature level in chamber h is carried out (in the case of a full tank, the pump delivers only the incoming colder liquid). Based on the spatial division of container 1 by pressure housing 3 into two chambers h and f, an always constant, self-regulating liquid level m in container 1 (also during operation of the pump) and a thermal separation of liquids are carried out. By this thermal separation of two chambers h and f, also during pump operation, the liquid remains in upper chamber f always in the boiling state of $P_1$, and the heat that enters via neck pipe 6 as well as the conduction of the low level of pump heat via valve 4 depicted in FIG. 2 is fed in gas form via liquid seal p to storage tank K. A non-division of the container has the result that during pump operation and full storage tank K, the input of heat that is only very low and toxic via container neck pipe 6 would not be sufficient to heat the incoming colder liquid corresponding to pressure $P_1$ in the boiling state. Based on these facts, a condensing-down of gas would take place, and the cold liquid would increase more and more in container 1 and cause an expulsion of the upper part of the container by overflowing.

In FIG. 2, a full section of one of the three pumps that are inserted into the pressure housing is depicted. The pump that is attached at the pressure housing (FIG. 1, reference number 3) by means of screws 30 has a pump cylinder 1, which is screwed to a blind flange 10 via a flow part 2. In this case, a ring gap d is formed, in which a membrane-pressure valve 6, 7 that is loaded with a disk spring 8 is attached. By the presence of this ring gap d and its two-sided seal 27, the individual installation of the pumps in the common pressure housing is possible.

The three pumps are actuated by a swash plate drive that is attached at the container cover, not shown. In the container, which has a capacity of only a few liters, the cryogenic liquid that is to be delivered is found. The transmission of the tensile forces for the pump pressure stroke from the drive to the pumps that are immersed in the container liquid is carried out via connecting rods 29 that are sealed in the container cover. When the stroke reverses, plungers 14, 17 are brought into a starting position against the pressure stroke by the force of springs 23. Here, a plunger ring 15, 16 that is pressed against pump cylinder 1 by springs is brought to rest on the arms of plunger body 14. Via the gap that is to be adjusted in this way, the liquid from the previous stroke cycle is hurled without pressure onto pressure side a of the plunger. At the same time, at the beginning of this stroke, a valve 4, in which a seal 5 is attached to seal connecting rod 29, was forced open by connecting rod 29 by the friction. Here, the heat that was produced by the plunger friction was drained off, so that optimum filling of the cylinder is thus always guaranteed. The temperature of the pressure liquid relative to the stored liquid also is not altered by this process, which has a positive effect on the measurement of the amount released.

When the stroke reverses, valve 4 is first closed by connecting rod 29, before plunger ring 15, 16 closes the gap at plunger body 14, and the pressure liquid is pushed into the common pressure housing (FIG. 1, reference number 3) via membrane-exhaust valve 6, 7 that is loaded by spring 8 from pump cylinder 1.

When the design pressure (maximum delivery pressure) is exceeded, a pressure limiter 17 that is designed as a disk spring is pressed through plunger ring 15, 16 from plunger body 14, and the overpressure is degraded via holes e. At the time when this stroke reverses, a bottom valve 20 that is found at the lower end of the pump cylinder, which is opened by a defined friction of a seal 21 on lower portion 18 of connecting rod 29, was also immediately opened. The stored liquid, without having to open a valve, can now flow back without pressure loss into volume b that is released from plungers 14, 17 into the pump cylinder via holes c. Shortly before the top dead center and because of the reduction in diameter of connecting rod 18, the friction between the latter and bottom valve 20 is withdrawn, and bottom valve 20 closes under the action of its own weight.

With the described pump arrangement, it is possible to pump liquids also with low levels of evaporation heat, such as, e.g., liquid hydrogen in the boiling state (without a static column) with good delivery efficiency. Since the heating of the pump cylinder is impossible through the forced opening of valve 4, an optimum cylinder filling is carried out with each stroke, whereby the otherwise usual heating of the feeder liquid is prevented.

What is claimed is:

1. Pump system for delivering cryogenic liquids that consists of a storage tank (K) for the cryogenic liquid that forms a liquid chamber (L) and a gas chamber (G) and at least one pump (2) that is arranged in a container (1), whereby container (1) is connected to storage tank (K) in such a way that a liquid level (m) can be adjusted in container (1), characterized in that a) container (1) is divided into two chambers (h, f), whereby one chamber (h) is arranged completely below gas chamber (G) of storage tank (K) and is connected via a liquid feed line (i) to liquid chamber (L) of the storage tank, while other chamber (f) is arranged above chamber (h) and at least partially also below gas chamber (G) of storage tank (K), whereby chamber (f) is connected via a gas return line (j) to gas chamber (G) of storage tank (K), b) the induction side of pump (2) is connected to chamber (h), while the pressure side is connected to a discharge point provided outside of container (1) for discharging cryogenic liquid to a consumer, c) chambers (h) and (f) are connected to one another via a connecting line (q), and d) above the open end of gas return line (j) that ends in chamber (f), a gas chamber (s) remains.

2. Pump system according to claim 1, wherein container (1) is divided into chambers (h, f) by means of a pressure housing (3), which, on the one hand, is connected to the pressure side of pump (2) and, on the other hand, is connected to the discharge point that is provided outside of container (1) for discharging cryogenic liquid.

3. Pump system according to claim 1, wherein several, i.e., at least two, pumps (2) are arranged in container (1), whose pressure sides are connected to common pressure housing (3).

4. Pump system according to claim 1, wherein pump (2) is designed as a reciprocating pump with connecting rod (29) and spring recovery, whereby the pump pressure stroke can be implemented by exerting tensile forces on plungers (14, 17) by means of connecting rod (29), and plungers (14, 17) can be returned to a starting position by means of springs (23).

5. Pump system according to claim 4, wherein connecting rod (29) is brought out from container (1) via a seal (5).

6. Pump system according to claim 5, wherein connecting rod (29) is brought out from container (1) via a heat-insulated container neck (6).

7. Pump system according to one of claim 1, wherein chambers (h, f) are largely separated thermally from one another.

* * * * *

UNITED STATES PATENT AND TRADEMARK OFFICE
CERTIFICATE OF CORRECTION

PATENT NO. : 6,481,218 B1
DATED : November 19, 2002
INVENTOR(S) : Helmut Dresler It is certified that error appears in the above-identified patent and that said Letters Patent is hereby corrected as shown below:

<u>Title page,</u>
Item [12], change "Drelser" to -- Dresler --.
Item [75], Inventor, change "Helmut Drelser" to -- Helmut Dresler --.

<u>Column 6,</u>
Line 19, delete "one of".

Signed and Sealed this

Twenty-fourth Day of August, 2004

JON W. DUDAS
*Director of the United States Patent and Trademark Office*